(12) United States Patent
Forero et al.

(10) Patent No.: US 12,401,595 B2
(45) Date of Patent: Aug. 26, 2025

(54) METHOD FOR CONTROLLING CONGESTION IN INTERMITTENTLY-CONNECTED AND LOSSY COMPUTER NETWORKS

(71) Applicant: United States Government as represented by the Secretary of the Navy, San Diego, CA (US)

(72) Inventors: Pedro Andres Forero, Bonita, CA (US); Peng Zhang, San Diego, CA (US); Dusan Radosevic, Poway, CA (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 297 days.

(21) Appl. No.: 18/224,826

(22) Filed: Jul. 21, 2023

(65) Prior Publication Data

US 2025/0016105 A1    Jan. 9, 2025

Related U.S. Application Data

(60) Provisional application No. 63/525,122, filed on Jul. 5, 2023.

(51) Int. Cl.
*H04L 47/127*    (2022.01)
(52) U.S. Cl.
CPC ................... *H04L 47/127* (2013.01)
(58) Field of Classification Search
CPC .................................................. H04L 47/127
See application file for complete search history.

(56) References Cited

U.S. PATENT DOCUMENTS 9,634,916 B2    4/2017    Briscoe et al.
11,146,479 B2   10/2021   Plate
(Continued)

OTHER PUBLICATIONS

Ha, Sangtae et al.; CUBIC: A New TCP-Friendly High-Speed TCP Variant; Inter-national Workshop on Protocols for Fast and Long Distance Networks; 2005.
(Continued)

*Primary Examiner* — Nicholas P Celani
*Assistant Examiner* — Wuji Chen
(74) *Attorney, Agent, or Firm* — Naval Information Warfare Center Pacific; Kyle Eppele; J. Eric Anderson

(57) ABSTRACT

A method for controlling congestion in intermittently-connected and lossy computer networks comprising: determining, at a local network node, a payoff score for each of a plurality of active flows of network traffic, wherein each active flow consists of a stream of in-transit packets at the local network node that come from a common source and share a common destination, wherein each active flow's payoff score is based on a pricing model that considers both a sojourn time and a position in a queue of each of an active flow's constituent packets; allocating unused buffer space across all active flows in the local network node based on relative traffic loads with a buffer-space allocation (BSA) agent; and controlling a rate at which packets from all active flows are received at the local network node with a hop-by-hop local-flow-control (LFC) agent according to each flow's payoff score.

17 Claims, 6 Drawing Sheets

(56) References Cited

U.S. PATENT DOCUMENTS

| | | | | |
|---|---|---|---|---|
| 2001/0026535 | A1* | 10/2001 | Amou | H04L 47/521 370/468 |
| 2002/0107908 | A1* | 8/2002 | Dharanikota | H04L 47/10 709/230 |
| 2004/0066785 | A1* | 4/2004 | He | H04L 12/5601 370/395.21 |
| 2009/0161684 | A1* | 6/2009 | Voruganti | H04L 49/90 370/412 |
| 2012/0182870 | A1* | 7/2012 | Francini | H04L 49/90 370/235 |
| 2017/0195259 | A1* | 7/2017 | Florea | H04L 47/726 |

OTHER PUBLICATIONS

Alrshah, Mohamed A. et al.; Elastic-TCP: Flexible Congestion Control Algorithm to Adapt for High-BDP Networks; IEEE Systems Journal, vol. 13, No. 2, Jun. 2019.

Nichols, K. and Jacobson, V.; "Controlling queue delay: A modern aqm is just one piece of the solution to bufferbloat." Queue, vol. 10, No. 5, pp. 20-34, May 2012.

Desanti, Claudio; IEEE Standard for Local and Metropolitan Area Networks-Virtual Bridged Local Area Networks—Amendment: Priority-based Flow Control; IEEE 802.1bb; available at https://1.ieee802.org/dcb/802-1qbb/, 2008.

Goyal, P. et al.; Backpressure flow control; Proceedings of the 2019 Workshop on Buffer Sizing, ser. BS '19. New York, NY, USA: Association for Computing Machinery, 2019.

Burleigh, S. et al.; Autonomous congestion control in delay-tolerant networks, Pasadena, CA: Jet Propulsion Laboratory, National Aeronautics and Space Agency, Tech. Rep., 2006.

Montazeri, B. et al.; Homa: A receiver-driven low-latency transport protocol using network priorities; Proceedings of the 2018 Conference of the ACM Special Interest Group on Data Communication, ser. SIGCOMM '18. New York, NY, USA: Association for Computing Machinery, 2018, pp. 221-235.

Schulman, J. et al.; Proximal policy optimization algorithms, arXiv, 2017.

Bengio, J. et al.; Curriculum learning; Proc. of the 26th Annual International Conference on Machine Learning, ser. ICML '09. New York, NY, USA: Association for Computing Machinery, 2009, pp. 41-48.

Anderson, T. E. et al.; Highspeed switch scheduling for local-area networks; ACM Trans. Comput. Syst., vol. 11, No. 4, pp. 319-352, Nov. 1993.

IEEE; "IEEE Standard for Local and metropolitan area networks—Media Access Control (MAC) Bridges and Virtual Bridged Local Area Networks—Amendment 17: Priority-based Flow Control," in IEEE Std 802.1Qbb-2011 (Amendment to IEEE Std 802.1Q-2011 as amended by IEEE Std 802.1Qbe-2011 and IEEE Std 802.1Qbc-2011), vol. No., pp. 1-40, Sep. 30, 2011, doi: 10.1109/IEEESTD.2011.6032693.

Forero, P.A. et al.; Active queue-management policies for undersea networking via deep reinforcement learning; Proc. of Oceans 2021: San Diego—Porto, Sep. 20-23, San Diego, CA USA—Porto, Portugal 2021, pp. 1-8.

Fawaz, H. et al.; Deep reinforcement learning for smart queue management; Proc. of Conf. on Networked Systems, Sep. 13-16, Lübeck, Germany 2021.

* cited by examiner

BSA Profile

METHOD FOR CONTROLLING CONGESTION IN INTERMITTENTLY-CONNECTED AND LOSSY COMPUTER NETWORKS

CROSS-REFERENCE TO RELATED APPLICATION

This application claims the benefit of U.S. provisional patent application 63/525,122, filed 5 Jul. 2023, titled "Method for Controlling Congestion in Intermittently-Connected and Lossy Computer Networks" (Navy Case #211162), which application is hereby incorporated by reference herein in its entirety.

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 211162.

BACKGROUND OF THE INVENTION

This invention relates to methods for network congestion control. Congestion control is a critical traffic management task responsible for minimizing network congestion. Network congestion typically occurs when packets arrive to a routing node at a higher rate than they can be forwarded. Congestion causes increase in packet delivery times and packets drops, with the latter due to queue overflows and packet timeouts. In turn, this causes network resources to be wasted due to packet retransmissions and in-transit packet storage. In the context of Internet Protocol (IP) networks, the Transmission Control Protocol (TCP) and its variants provide the end-to-end congestion-control functionality. The success of TCP in the Internet is to a large extent due to the low and stable delays and the low bit-error rates characteristic of typical Internet connections, and the low cost of packet retransmissions in terms of network resources. In the context of intermittently-connected and/or lossy networks (ICLNs), widely-used congestion-control solutions have been more elusive.

SUMMARY

Described herein is a method for controlling congestion in ICLNs comprising the following steps. The first step provides for determining, at a local network node, a payoff score for each of a plurality of active flows of network traffic. Each active flow consists of a stream of in-transit packets at the local network node that come from a common source and share a common destination. Each active flow's payoff score is based on a pricing model that considers both a sojourn time and a position in a queue of each of an active flow's constituent packets. Another step provides for allocating unused buffer space across all active flows in the local network node based on relative traffic loads with a buffer-space allocation (BSA) agent. Another step provides for controlling a rate at which packets from all active flows are received at the local network node with a hop-by-hop local-flow-control (LFC) agent according to each flow's payoff score.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
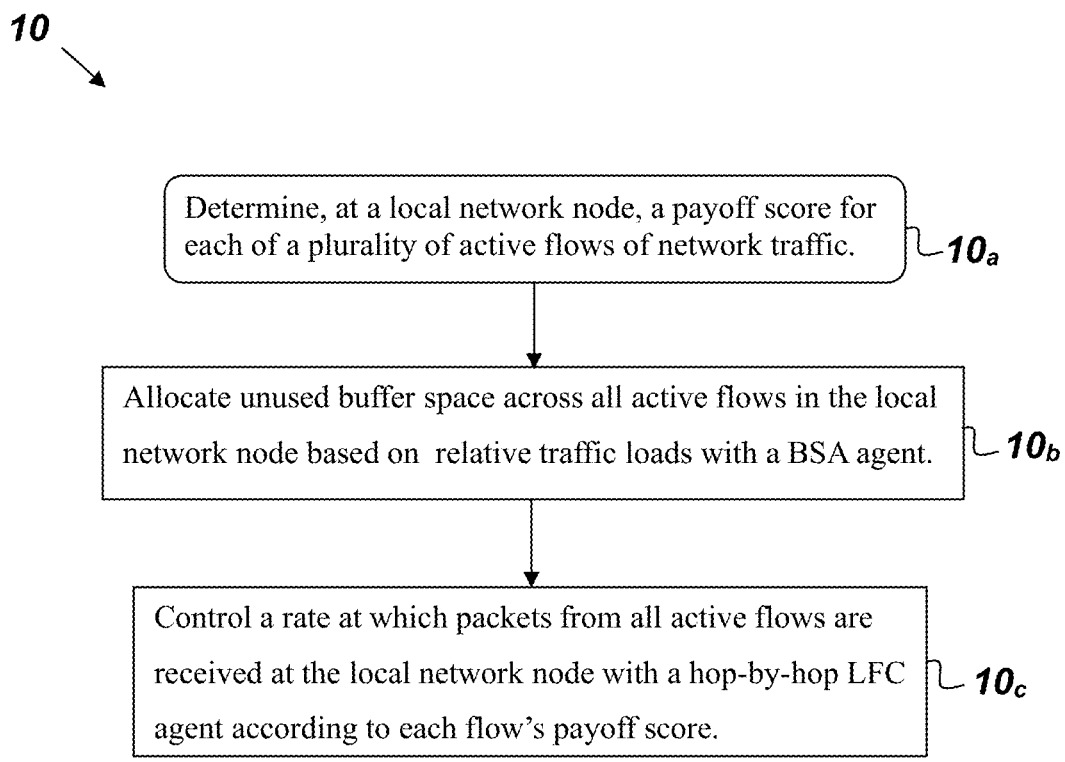
FIG. 1 is a flowchart of a method for controlling congestion in ICLNs.

FIG. 1 is a flowchart of a method 10 for controlling congestion in ICLNs that comprises, consists of, or consists essentially of the following steps. ICLNs are often characterized by low quality links, high transmission delays and jitter. Method 10 may be used to improve the efficiency of the network by monitoring and influencing the traffic flows by reacting quickly to the onset of congestion with local congestion-control actions and propagating direct and indirect congestion control indicators toward the traffic sources. The first step 10a provides for determining, at a local network node, a payoff score for each of a plurality of active flows of network traffic. Each active flow consists of a stream of in-transit packets at the local network node that come from a common source and share a common destination. Each active flow's payoff score is based on a pricing model that considers both a sojourn time and a position in a queue of each of an active flow's constituent packets. Another step 10b provides for allocating unused buffer space across all active flows in the local network node based on relative traffic loads with a BSA agent. The resulting Markowitz Portfolio Selection problem includes a measure of risk that is quantified through the variability of the returns received from each flow. Another step 10c provides for controlling a rate at which packets from all active flows are received at the local network node with a hop-by-hop LFC agent according to each flow's payoff score.

ICLNs are characterized by high transmission delays and jitter, low quality links with high bit-error rates, and lack of a persistent end-to-end path between the traffic source and destination. Thus, they violate fundamental TCP assumptions, which limits, and in some cases prevents altogether, the use of TCP in ICLNs. Furthermore, for a large set of applications ICLN traffic is expected to be bursty and dominated by short request/response messaging for command-and-control (C2), and information collection and dissemination tasks. Even versions of TCP designed to deal with long delays and high bandwidth-delay-product networks can be challenged in ICLNs due to their need for roundtrip-time (RTT) and retransmission timeout (RTO) parameter estimates. Furthermore, the delay in the issuance of the congestion control actions at the traffic sources can make TCP-based solutions ineffective, especially when bursty traffic is the dominant traffic type flowing thru the network.

Method 10 represents an alternative paradigm to end-to-end congestion control that enables intermediate network nodes to take congestion control actions independently and without notifying the traffic source. In this context nodes are able to decide whether and at what speed they want to receive packets from any given flow. Method 10 uses LFC and BSA management to develop a congestion control framework for ICLNs. An LFC agent may be used to decide whether or not to perform one of the following actions for a given active flow to mitigate network congestion according to an LFC policy: reduce a flow speed, pause the given flow, or restart the given flow if paused. The LFC policy may be learned via a Proximal Point Optimization (PPO) deep reinforcement learning algorithm using a Markov Decision Process (MDP) as a modeling abstraction of the queue dynamics. The overarching buffer-space allocation given to each flow may be defined via a portfolio selection strategy that encourages large buffer allocations to flows that provide a higher payoff to the node. The payoff may be measured based on a pricing model for packets that embeds within it the notions of sojourn time and packet position in the queue, in lieu of the queue occupancy level, as local congestion indicators. Method 10, thus, mitigates the risk of bufferbloat.

Each traffic flow flowing through the node may be managed by an individual LFC agent that controls the rate at which packets from the flow are received. The LFC agent policy may be based on aggregate packet sojourn statistics, its buffer-space allocation and its buffer occupancy level. The LFC agent can stop a flow temporarily to mitigate congestion, while forcing nodes upstream to adjust the forwarding rates for the congested flow.

Figure 2A:
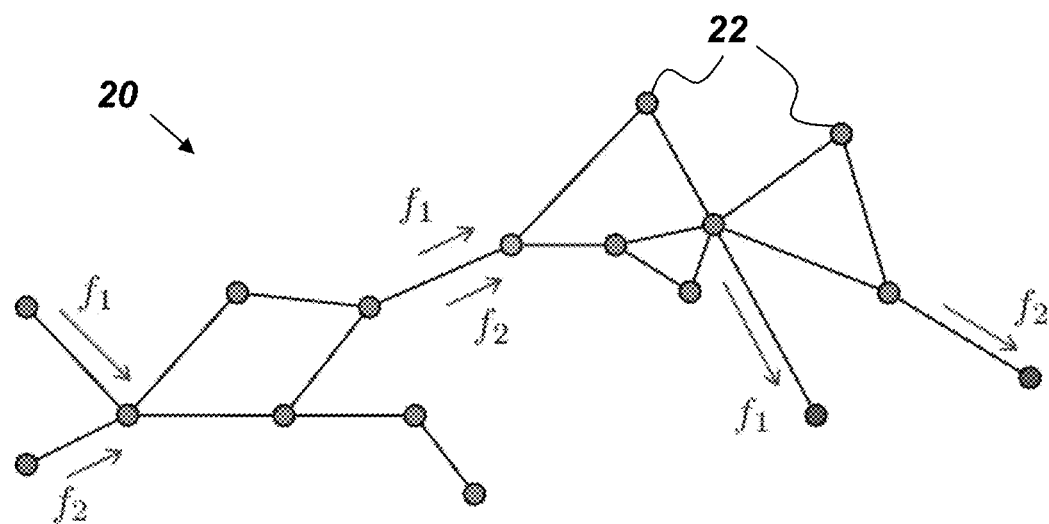
FIG. 2A is an illustration of an example ICLN.
Figure 2B:
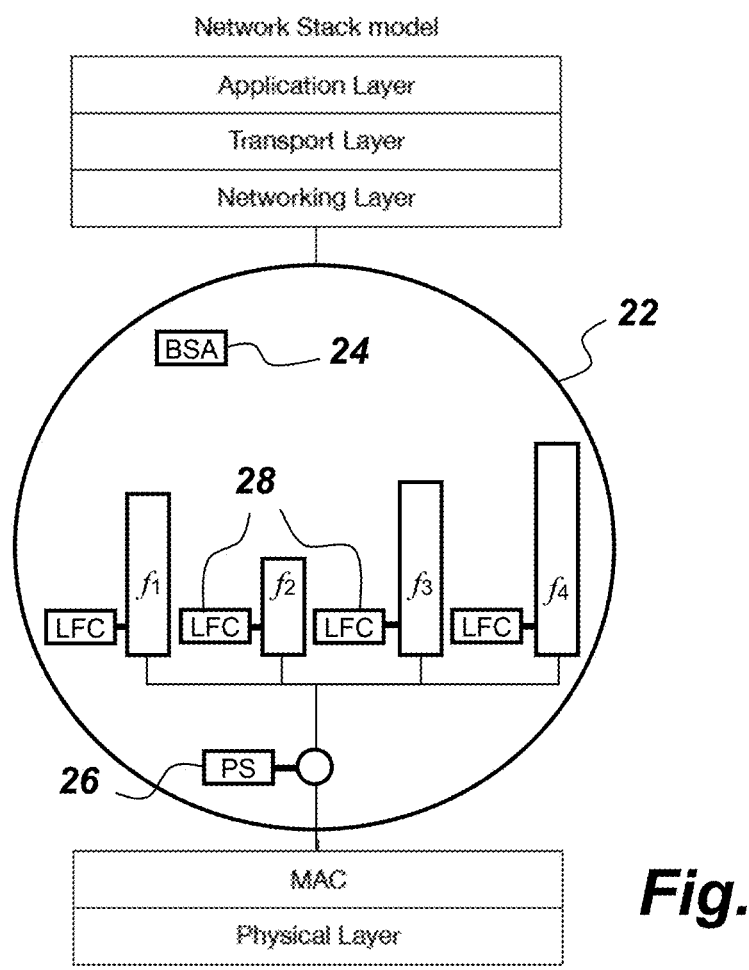
FIG. 2B is an illustration of an example framework overview of a method for controlling congestion in ICLNs.

FIG. 2A is an illustration of an example ICLN 20 (also referred to herein as $\mathcal{N}$) with N nodes in $\mathcal{N} := \{1, \ldots, N\}$. FIG. 2B is an illustration of a node 22 of the ICLN 20. Each node n (represented in FIGS. 2A and 2B as a circle 22) in ICLN 20 comprises a BSA module 24, a packet scheduler (PS) 26, and an LFC module 28. The BSA module 24 is responsible for allocating available buffer space to each queue. The PS 26 is responsible for allocating the transmission bandwidth across all active flows and defining the order in which packets are transmitted. The LFC module 28 is responsible for controlling the speed with which packets for a given flow are accepted. Each node n has a buffer space allocation of $Q \in \mathbb{N}$ (measured in bytes) and is able to transport multiple traffic flows $(f_1, f_2, f_3, \ldots f_n)$. A flow is defined as a stream of packets corresponding to a common source and destination pair where each flow corresponds to one of C traffic classes. For any node $n \in N$, let $N_n$ denote its set of one-hop neighbors. Each flow inherits prioritization and quality-of-service (QOS) requirements from the traffic class it belongs to. An active flow in $n \in N$, i.e., a flow for which there are in-transit packets at node n, is assigned to an individual queue in which its packets are stored. All active queues implement a first in, first out (FIFO) policy and a tail-drop management scheme, and are managed by the local BSA, PS, and LFC modules. Each active queue receives a minimal space allocation of $Q_0 < Q$. The BSA module assigns additional buffer space to active queues. Method 10 enables intermediate network nodes 22 to manage network congestion locally on a per-flow basis.

When a queue within the node becomes active, the node's BSA is responsible for allocating buffer space for that queue. The BSA also reevaluates the queues' buffer-space allocations periodically to adjust them based on the traffic characteristics of each flow. When a queue is full based on its BSA any new packet arriving to that queue is dropped due to the tail-dropped policy used. Packets are forwarded from active queues based on a schedule defined by the PS. Let F denote the number of active queues in node n. The PS defines a bandwidth-allocation profile $\mu_n := [\mu_{n,1}, \ldots, \mu_{n,F}]' \in \mathbb{R}^F$, where $(\cdot)'$ denotes the transpose operator, $\mu_{n,f} \in [0, 1]$, $\forall f$, the portion of the available transmission bandwidth B allocated to the fth queue, and $1'\mu_n = 1$, where 1 denotes a vector of ones of appropriate size. It also defines the service schedule for each queue, and thereby the order in which packets are transmitted.

The PS policy can be designed based on the QoS requirements and priority associated with each flow. Furthermore, it can be dynamically adjusted to accommodate the dynamics of the traffic and the available transmission bandwidth. The LFC module regulates the flow rate for each active flow. In an embodiment of method 10, the LFC can request the PS from any neighboring node, say node $n' \in \mathcal{N}$, to reduce the bandwidth allocation, pause or restart any flow. The PS of the neighboring node can be configured to always grant such requests. When a flow rate is reduced or the flow is paused in response to an LFC request, the PS does not reallocate the available bandwidth to any other flow. Thus, the effective bandwidth allocation profile at a node n', in which there are F' active flows, is $\mu_{n'}^E := [\mu_{n',1}^E, \ldots, \mu_{n',F'}^E]' \in \mathbb{R}^{F'}$, with $\mu_{n',f}^E \in [0,1]$ denoting the effective bandwidth allocation to flow f, and satisfies $1'\mu_n^E \le 1$. When a flow is paused, an explicit congestion notification (ECN) may also be sent to the source of the flow. Similarly to their role in active queue management (AQM), ECNs direct the source to reduce its traffic generation rate and accelerate the issuance of congestion-control actions (cf., implicit congestion control methods such as TCP).

Embodiments of method 10 include designing BSA and LFC policies to mitigate packet congestion locally. The BSA policy uses summary statistics captured per queue to define a BSA profile that maximizes the packet throughput achieved by the node. Summary statistics subsume the average benefit (for a collection of packets) and risk associated with a given BSA profile. The LFC policy uses internal queue statistics and information from the BSA and PS modules to control the effective packet acceptance rate for any flow. The resulting LFC and BSA policies will be compatible with any PS policy if the PS can control individual flow transmission rates as requested by the LFC module of a neighboring node.

The BSA policy may be developed based on a portfolio management strategy. In that context, the node has a portfolio of F holdings where each stock in the portfolio corresponds to a traffic flow. The f-th buffer occupancy level $q_f \in \mathbb{N}$ (measured in bytes), with $q_f \le \check{q}_f$ and $\check{q}_f \in [Q_0, \ldots, Q-(F-1)Q_0]$ denoting the queue space allocation for the f-th queue, corresponds to the amount of stock f owned by the node. The unused queue space across all queues $\Omega \ge 0$, which represents the node's available investment capital, is defined as $$\Omega := \sum_{f=1}^{F} (\check{q}_f - \max\{Q_0, q_f\}) \le Q - \sum_{f=1}^{F} Q_0 \qquad (1)$$

where each summand in the first sum corresponds to the available queue space per queue based on the current BSA. The node receives a conveyance fee per packet it forwards.

The price of a packet with index $i \in \mathbb{N}$ in the f-th queue is defined as a function of its size $b_i \in \mathbb{N}$ (in bytes), its sojourn time $\delta_i$, i.e., the time it spent in its queue waiting to be forwarded, and its position in the queue $\zeta_i$ as $$p_f(b_i, \delta_i, \zeta_i) := \alpha_f g(b_i) e^{-\frac{\delta_i}{\eta_f}} \gamma_f^{\zeta_i} \quad (2)$$

where $\eta_f > 0$ and $\gamma_f \in (0, 1]$ are tuning parameters that control the rate at which the price of a packet decreases as a function of $\delta_i$ and the base for the packet price adjustment according to its position in the queue, g: $\mathbb{N} \to \mathbb{R}_+$ is a monotonically increasing function of packet size, and $\alpha_f > 0$ is a scalar used to adjust the price of packet based on the priority of the flow they belong to. According to Equation (2), the price of a packet decreases as $\delta_i$ increases and is discounted based on the packet position in the queue with an exponential discount factor $\gamma_f$. The discounting term approaches unity as the packet moves up in the queue. When a packet is dequeued its corresponding $\zeta_i = 0$ and, thus, the discounting factor equals unity. The per-packet conveyance fee received by the node for packet i in queue f equals its price when dequeued, i.e., $p_f(b_i, \delta_i, 0)$.

Based on Equation (2) and the number of active flows, the BSA policy seeks a space allocation profile for the node's available queue space that maximizes its expected profit based on the conveyance fees it expects to collect when forwarding packets. To that end, the notion of rate of return which defines the fractional change in price for a packet since its arrival to the queue is introduced. With $Q_f^{(t)}$ defining the set of packets in the f-th queue at time t, the rate of return of stock f, i.e., that of the f-th traffic flow, at time t is defined as $$\rho_f^{(t)} = \frac{\sum_{i \in Q_f^{(t)}} p_f(b_i, \delta_i^{(t)}, \zeta_i^{(t)}) - \sum_{j \in Q_f^{(t)}} p_f(b_j, 0, \zeta_j^{(t_j^0)})}{\sum_{i \in Q_f^{(t)}} p_f(b_i, 0, \zeta_i^{(t_i^0)})} \quad (3a)$$

$$= \frac{\Lambda_{f,t}}{\Lambda_{f,0}} \sum_{i \in Q_f^{(t)}} \left( \frac{\alpha_f g(b_i) \gamma_f^{\zeta_i^{(t)}}}{\Lambda_{f,t}} e^{-\delta_i^{(t)}/\eta_f} \right) - 1 \quad (3b)$$

where $t_i^0 < t$ denotes the arrival time of packet i to the queue, $\delta_i^{(t)}$ its sojourn time at time t, $\zeta_i^{(t)}$ its position in the queue at time t, $\Lambda_{f,0} := \sum_{i \in Q_f^{(t)}} p_f(b_i, 0, \zeta_i^{t_i^0})$ and $\Lambda_{f,t} := \sum_{i \in Q_f^{(t)}} p_f(b_i, 0, \zeta_i^{(t_i)})$. The ratio $\Lambda_{f,t}/\Lambda_{f,0} \geq 1 \forall t$ and represents the gain in the stock price based on the progress that packets have made towards the front of the queue, and $$\alpha_f g(b_i) \gamma_f^{\zeta_i^{(t_i)}} / \Lambda_{f,t}$$

weighs the impact of the sojourn time on the return rate. Low $\rho_f^{(t)}$ values indicate high sojourn times and little advancement of packets towards the front of the queue since their arrival to the queue and are, thus, reasonable choices as congestion indicators. The rate of return $\rho_f^{(t)}$ is set to a positive constant when the queue is empty.

Next, we consider the queue-space allocation problem from the vantage point of portfolio selection. The BSA policy seeks to redistribute the unused queue space $\Omega$ to traffic flows yielding a high return rate, i.e., flows with weaker congestion indicators. A flow f that yields high or low aggregate rate of returns should respectively receive a large or small $\check{q}_f$. Although counterintuitive, limiting the BSA for congested flows serves as an indicator of congestion to the LFC policy and prevents exacerbating congestion by limiting the number of packets from that flow that can be received and stored.

Continuing with the stock portfolio analogy, the rate of return of each stock may be evaluated periodically over a window of M samples comprising the columns of $R^{(t)} := [\rho^{(t-1)}, \ldots, \rho^{(t-M)}]$, where $\rho^{(t-m)} := [\rho_1^{(t-m)}, \ldots, \rho_F^{(t-m)}]' \in \mathbb{R}^F$, $m = 1, \ldots, M$. Let $\bar{\rho}^{(t)} := [\bar{\rho}_1^{(t)}, \ldots, \bar{\rho}_F^{(t)}]'$ denote the mean-rates-of-return vector estimated using columns of $R^{(t)}$ and $\Sigma^{(t)} \in \mathbb{R}^{F \times F}$ the corresponding covariance matrix estimate. The BSA allocation problem is cast a portfolio selection problem that seeks to obtain the vector $\hat{w} \in \mathbb{R}^F$ as the solution of the following optimization problem:

$$\max_{w \in \mathbb{R}^F} w' \bar{\rho}^{(t)} - \theta w' \Sigma^{(t)} w \quad (4a)$$

Subject to $1'w = 1, w \succeq 0$ \quad (4b)

where $\theta > 0$ is a tuning parameter that represents the risk aversion level chosen for the selection of the portfolio, and $\succeq$ is an entry-wise inequality. Vector w defines the BSA across the portfolio. The variance term in Equation (4) captures the variability the rates of return and, thus, the perceived risk of allocating buffer space to a particular stock. The constrained optimization problem in Problem (4) is convex and, thus, it has a unique maximum. It can be solved efficiently via one of several convex optimization algorithms known in the art. Once $\hat{w} := [\hat{w}_1, \ldots, \hat{w}_F]'$ is available, the new BSA profile is defined via $\Omega \hat{w}$ as:

$$\check{q}_f = \max\{Q_0, q_f\} + \Omega \hat{w}_f, \forall f. \quad (5)$$

Per active flow, the LFC policy, enforced by an LFC agent, decides whether to reduce the flow speed, pause it or restart it, if paused. This decision-making process followed by the LFC agent is modeled as an MDP using a modeling abstraction of the queue dynamics. The LFC agent may be trained via a deep RL framework using the PPO algorithm. The MDP model and PPO algorithm are discussed in the ensuing paragraphs.

The MDP describes the evolution of the environment as the LFC agent interacts with it. With $\tau$ defining the decision epoch and $\mathcal{S}$ ($\mathcal{A}$) the state (action) space, the LFC agent observes the state $s_f^{(\tau)} \in \mathcal{S}$ and decides the action $a_f^{(\tau)} \in \mathcal{A}$ to execute. The environment evolves to a new state $s_f^{(\tau+1)} \in \mathcal{S}$ and the LFC agent receives a reward $r_f^{(\tau+1)} \in \mathbb{R}$. The dynamics of the environment are characterized by the set of transition probabilities $\mathcal{P}$ of the form:

$$P_f(s'_f, r'_f | s_f, a_f) := Pr\{s_f^{(\tau+1)} = s'_f, r_f^{(\tau+1)} = r'_f | s_f^{(\tau)} = s_f, a_f^{(\tau)} = a_f\} \quad (6)$$

with $s'_f, s_f \in \mathcal{S}$, $r'_f \in \mathbb{R}$, and $a_f \in \mathcal{A}$, which define the probability of the system to transition to $s'_f$ and receive a reward r' given that the system is currently in $s_f$ and the LFC agent takes action $a_f$. In our case, the probabilistic transitions are due to the stochastic nature of the traffic and the available transmission bandwidth, and their impact on the BSA policy which translates to unpredictable variability in the BSA.

Note that the time in-between decision epochs is defined by the transmission schedule associated with each traffic flow. The elements of the MDP describing the decision-making process followed by the LFC agent are described next.

With respect to state space, let $\mathcal{D}_f^{(\tau)}$ denote the sequence of sojourn times for all packets dequeued from queue f during the last Z decision epochs. The state of the f-th queue observed by its supervising LFC agent at the beginning of decision epoch τ is:

$$s_f^{(\tau)} := [\check{q}_f^{(\tau)}, \mu_f^{(\tau)} B^{(\tau)}, \ell_f^{(\tau)}, q_f^{(\tau)}, \phi_f^{(\tau)}, \omega_f^{(\tau)\prime}]' \in S \subseteq \mathbb{R}^{10} \quad (7)$$

Where $\check{q}_f^{(\tau)}$ is the latest queue-space allocation issued by the BSA, $\mu_f^{(\tau)} B^{(\tau)}$ is the bandwidth allocated by the PS, $l_f^{(\tau)} \in [0,1]$ is the packet loss rate experienced by the queue due to its tail-drop policy between (τ−1, τ], $q_f^{(\tau)}$ is the queue occupancy, $\phi_f^{(\tau)} \in$ {normal, paused, slowed-down} is a categorical variable defining the state of the flow, and $\omega_f^{(\tau)} \in \mathbb{R}^5$ is a vector containing summary sojourn time statistics for $\mathcal{D}_f^{(\tau)}$. In particular, $\omega_f^{(\tau)} := [d_{f,min}^{(\tau)}, d_{f,max}^{(\tau)}, d_{f,mean}^{(\tau)}, d_{f,medium}^{(\tau)}, d_{f,std}^{(\tau)}]'$ where $d_{f,min}^{(\tau)}$, $d_{f,max}^{(\tau)}$, $d_{f,mean}^{(\tau)}$, $d_{f,medium}^{(\tau)}$, and $d_{f,std}^{(\tau)}$ are respectively the minimum, maximum, mean, median, and standard deviation values of the element of $\mathcal{D}_f^{(\tau)}$.

With respect to action space, upon observing the state of the queue at t, the LFC agent selects a discrete action $a_f^{(\tau)} \in \mathcal{A}(s_f^{(\tau)}) \subset$ {no-change, pause, slow-down, restart}. The set of actions available to the LFC agent is a function of $s^{(\tau)}$ via $\phi_f^{(\tau)}$, and is defined as $\mathcal{A}(s_f^{(\tau)}) :=$ {no-change, slow-down, pause, restart}$\setminus \mathcal{F}(\phi_f^{(\tau)})$, where \ denotes the set difference operation, and $$\mathcal{F}(\phi_f^{(\tau)}) := \begin{cases} \{\text{restart}\} & \phi_f^{(\tau)} = \text{normal} \\ \{\text{pause}\} & \phi_f^{(\tau)} = \text{paused} \\ \{\text{slow-down}\} & \phi_f^{(\tau)} = \text{slowed-down} \end{cases} \quad (8)$$

Note that $|\mathcal{A}(s_f^{(\tau)})|=3$ for all $s_f^{(\tau)} \in \mathcal{S}$ and f, τ. When the LFC agent of a given node chooses the pause, slow-down or restart actions, the LFC agent/module generates a request message for the PS in the neighboring node from where the flow is coming from to execute the action.

With respect to transition function, the packet queueing and dequeuing processes characterize the evolution of the MDP. These processes are externally driven by the traffic flow dynamics and a medium access control (MAC) protocol. The queue occupancy level and the flow state evolve according to:

$$q_f^{(\tau+1)} = \min\{\max\{0, q_f^{(\tau)} - \mu_f^{(\tau)} B^{(\tau)}\} + \Psi_f^{(\tau)}, \check{q}_f^{(\tau)}\} \quad (9)$$

where $\Psi_f^{(\tau)}$ is a random variable representing the packet arrivals (in bytes) to the queue in the interval (τ, τ+1]. Equation (9) assumes that only packets stored in the queue prior to τ can be transmitted in the interval (τ, τ+1]. The flow state evolves according to $$\phi_f^{(\tau+1)} = \begin{cases} \phi_f^{(\tau)} & \text{if } a_f^{(\tau)} = \text{no change} \\ a_f^{(\tau)} & \text{Otherwise} \end{cases} \quad (10)$$

The evolution of the remaining variables in $s^{(\tau)}$ cannot be easily obtained in analytical form. Their evolution can, however, be traced numerically as the MDP evolves.

The reward received by the LFC agent when taking action $a_f^{(\tau)}$ when in $s^{(\tau)}$ and evolving to $s^{(\tau+1)}$ is given by:

$$r_f^{(\tau+1)} = \left[\hat{h}_f^{(\tau+1)} + C \cdot (1 - \ell_f^{(\tau+1)})\right] 1_{\{\phi_f^{(\tau+1)} \neq \text{paused}\}} \quad (11)$$

where $\hat{h}_f^{(\tau+1)} := ((d_{f,mean}^{(\tau+1)} - d_{f,median}^{(\tau+1)})/d_{f,std}^{(\tau+1)}$ denotes the nonparametric skew statistic and C>0 is a tuning parameter. The nonparametric skew $\hat{h}d_f^{(\tau+1)} \in [-1,1]$ measures the skewness of the sojourn time probability density function (p.d.f.). If the flow is not in a paused state, then the agent is rewarded with a positive value if the sojourn times p.d.f. is left-skewed in which case the mass of sojourn times p.d.f. is concentrated to the left of its mean value. Otherwise, the LFC agent receives a zero or negative reward. The LFC agent is also rewarded proportionally to the packet acceptance rate $(1-l_f^{(\tau+1)}) \in [0,1]$ experienced by the queue during the interval (τ, τ+1]. If the flow is paused, then the LFC agent receives zero reward.

Within an RL framework, the LFC agent seeks to learn a policy π: $\mathcal{S} \to \mathcal{A}$ that maps the observed state of the environment $s_f \in \mathcal{S}$ into an action $a_f \in \mathcal{A}$. In our case, the policy π defines whether to reduce the flow speed, pause it or restart it, if paused. Typically, RL seeks the policy that maximizes the expected sum of rewards given by:

$$\max_{\pi \in \Pi} \mathbb{E}_\pi \left[\sum_{\tau=0}^\infty \gamma^\tau r_f(s_f^{(\tau)}, a_f^\tau)\right] \quad (12)$$

where $\gamma \in (0,1)$ is a discount factor, Π defines the set of feasible policies π, and the expectation $\mathbb{E}_\pi$ is taken over the state-action marginal distribution of the pair $(s_f, a_f)$ trajectory induced by a policy π.

In an embodiment of method 10, a PPO algorithm is used to learn the LFC policy $\pi_\theta$, where θ denotes the set of deterministic parameters defining the policy. Let $\beta^{(\tau)}(\theta) := \pi_\theta(a_f^{(\tau)}|s_f^{(\tau)})/\pi_{\theta_{old}}(\pi_{\theta^{old}}a_f^\tau|s_f^{(\tau)})$ denote the ratio between the policies defined by θ by the current stochastic gradient descent update and the old policy $\pi_{\theta^{old}}$ gold defined by fold, and the advantage function $\hat{A}(s_f^{(\tau)}, a_f^{(\tau)})$. PPO is a policy gradient algorithm that uses the clipped surrogate loss function:

$$J^{Clip}(\theta) = \hat{\mathbb{E}}^\tau\{\min[\beta^\tau(\theta)\hat{A}(s^{(\tau)}, a_f^{(\tau)}), \text{clip}(\beta^\tau(\theta), 1-\epsilon, 1+\epsilon)\hat{A}(s^{(\tau)}, a_f^{(\tau)})]\} \quad (13)$$

where $\hat{\mathbb{E}}$ denotes the empirical expected value, $\epsilon \in (0, 1)$, and the function clip (x, 1−ϵ, 1+ϵ) clips the value of the scalar x to be within [1−ϵ, 1+ϵ]. The objective function in Equation (13) removes the incentive for choosing a θ that will cause $\beta^\tau(\theta)\hat{A}$ to go outside the interval [1−ϵ, 1+ϵ]. After applying the minimum operator, Equation (13) becomes a lower bound for the classical policy gradient objective $\beta^\tau(\theta)\hat{A}(s^{(\tau)}, a_f^{(\tau)})$. PPO improves the stability in the learning of the policy by constraining the size of the change allowed in $\pi$ in between stochastic gradient descent updates.

Algorithm 1, presented below, represents a summarized embodiment of method 10 as a local queue management framework for controlling congestion in an ICLN. Algorithm 1 relies on the concurrent execution of the BSA and LFC policies discussed above. Although operating concurrently, these policies are executed at configurable and possibly different time scales. The execution of the proposed local queue management policies in node $n \in \mathcal{N}$ is summarized as Algorithm 1, which presumes the existence of F active flows and their corresponding BSA profile, a baseline LFC policy $\pi_{\theta^*}$ learned via the PPO algorithm described above, where $\theta^*$ denotes the set of parameters defining the LFC policy, and uses $n' \in \mathcal{N}_n$ and $\tilde{n}^f \in \mathcal{N}$ to denote the one-hop neighbor of n from where flow f is being forwarded to n and the source node for flow f, respectively. The procedure UPDATE QUEUE OCCUPANCY represents the evolution of the queue occupancy due to packet arrivals and departures as discussed above. Note that in this work $\pi_{\theta^*}$ is assumed to be common to all agents, and thus all traffic classes. Additional refinement in the definition of the LFC policies based on the traffic class is possible.

---

Algorithm 1 Queue-management policy execution

Require: $Q, Q_0, F^{(0)} > 0, \{(q_f^{(0)}, \check{q}_f^{(0)}, \phi_f^{(0)})\}_{f=1}^{F^{(0)}}$ and $\pi_{\theta^*}$
1:  while $\tau > 0$ do
2:   for $f = 1, \ldots, F^{(\tau)}$ do
3:    Observe $s_f^{(\tau)}$                    ▷ Execute LFC policy
4:    Compute $\rho_f^{(\tau)}$ via (3)
5:    $a_f^{(\tau)} \leftarrow \pi_{\theta^*}(s_f^{(\tau)})$
6:    if $a_f^{(\tau)}$ is not no-change then
7:     Send flow-state change requests to $n' \in \mathcal{N}_n$
8:     Send ECN to $\tilde{n}^f \in \mathcal{N}$         ▷ Optional
9:    end if
10:   procedure UPDATE QUEUE OCCUPANCY
11:    Dequeue packets from queue f at rate $\mu_f^E B_n$
12:    Enqueued $\Psi_f^{(\tau)}$ bytes in queue f
13:   end procedure
14:  end for
15:  if $F^{new}$ new flows then       ▷ Add and remove flows
16:   $F^{(\tau+1)} = F^{(\tau)} + F^{new}$
17:   Start $F^{new}$ new LFC agents equipped with $\pi_{\theta^*}$
18:  else if $F^{inactive}$ Inactive flows then
19:   $F^{(\tau+1)} = \max\{F^{(\tau)} - F^{inactive}, 0\}$
20:   Remove the $F^{inactive}$ LFC agents
21:  else
22:   $F^{(\tau+1)} = F^{(\tau)}$
23:  end if
24:  if $F^{(\tau+1)} \neq F^{(\tau)}$ or then    ▷ Execute BSA policy
25:   Compute $\overline{\rho}_n^{(\tau)}$ and $\Sigma_n^{(\tau)}$
26:   Compute $w_n^{(\tau)}$ via (4)
27:   Update $\{\check{q}_f^{(\tau)}\}_{f=1}^{F^{(\tau+1)}}$ via (5)
28:  else
29:   Set $\check{q}_f^{(\tau+1)} = \check{q}_f^{(\tau)}, f = 1, \ldots, F$
30:  end if
31:  $\tau \leftarrow \tau + 1$
32: end while

---

The LFC and BSA policies can be updated periodically based on a fixed schedule. Alternatively, the LFC policy can be updated after a round of interactions with the neighboring node where the corresponding flow originates or a local packet forwarding round occurs. In this case, the length of the time between LFC decision epochs varies based on the configuration of the MAC protocol used by the node. Recall that the LFC policy interacts with the PS's in neighboring nodes to change the state of a flow. Implementing this feedback mechanism may require the availability of an independent control channel, or if per-hop acknowledgement messages are used, the use of a dedicated set of 2-bits in the acknowledgement header to notify the neighboring PS of any transmission-rate change requests, and a similar mechanism to notify the LFC agent that the request was successful. In addition to the periodic BSA updates, the BSA policy also provides a new BSA profile when a new flow is created or when an inactive flow is removed.

The following description illustrates the performance of method 10 via numerical tests that focus on the management of F=4 active flows within a single node. In this test, each queue was modeled in Python as an instance of a common environment class that inherited its structure from the OpenAI gym application programming interface (API). The traffic arrivals for each queue were modeled as a Poisson Process with exponentially distributed packet arrivals configured via their mean arrival rate $\lambda$. Packet departures were modeled via a fair queuing policy that distributed the fixed transmission bandwidth B=2 kilobytes-per-second equally across all queues. Packet sizes were modeled as independent and identically distributed uniform random variable in the interval [100,150] bytes. The packet dequeuing process incurred a nominal delay of 10 milliseconds per packet, irrespective of the packet size. The evolution $\{a_f^{(\tau)}\}_{f=1}^4$ was modeled as described above using a fixed step interval of 60 seconds that corresponded to the time in between decision epochs $\tau$. Per f, the sojourn statistics in $\omega_f^{(\tau)}$ were computed using 60-second sojourn-time metrics aggregated over a sliding window that comprised the last 100 measurements. The BSA policy was configured to be executed on a schedule. All scenarios considered for training and testing were limited to 6 hours and 400 decision epochs. The following subsections describe the training of the LFC agents and the BSA strategy applied to a single node.

With respect to the numerical tests mentioned above, the LFC agent policy was trained using the PPO implementation in RLlib and the hyper-parameter search workflow was implemented with Ray Tune. Our PPO algorithm configuration used the tanh activation function and computed the advantage function $\hat{A}$ using a value function baseline obtained via a critic deep neural network (DNN). During example training of the LFC policy for the numerical tests, $\check{q}_f$ and $\lambda$ were modeled as uniform random variables in the intervals [75, 1 275] kilobytes (KB) and [0.5, 8] packets-per-second, respectively. These parameters were randomly drawn at the beginning of each episode and kept fixed throughout. One training approach sampled $\check{q}_f$ and $\lambda$ over their entire distribution domain. Although the episode rewards seemed to converge, the auxiliary policy training curves showed a near-zero value function (VF) explained-variance and entropy after a few iterations for a wide-range of hyper-parameter choices. This behavior was believed to be caused by the LFC agent quickly learning a suboptimal, deterministic policy and it being unable to learn to predict the VF over the PPO horizon. Poor asymptotic performance of machine learning algorithms in environments with high variability or when solving tasks that involve subtasks of significantly different difficulty has been documented as a common challenge when training machine learning algorithms. The LFC agent training method may be refined with ideas from curriculum learning which suggests to gradually increase the complexity of the environment during the training process.

For the example embodiment of method 10 employed in the numerical tests referenced above, the variability in the environment was incrementally increased via parameter sequences $\varepsilon_1$=(1200, 975, 675, 375, 75) and $\varepsilon_2$=(0.5, 2.1, 3.7, 5.3, 6.9, 8.5). A total of 10 tasks indexed as k=0, . . . , 9 were defined using $\varepsilon_1$ and $\varepsilon_2$. For task k, parameters $\hat{\varepsilon}_1(k):=\varepsilon_1(\lfloor k/2 \rfloor)$ and $\hat{\varepsilon}_2(k):=\varepsilon_2(\lfloor (k+1)/2 \rfloor)$, where $\lfloor \cdot \rfloor$ denotes the rounding down operation and $\varepsilon_1(m)(\varepsilon_2(m))$ the m-th entry of the sequence $\varepsilon_1(\varepsilon_2)$, were used to define the sampling intervals. Thus, when using task k from the curriculum, $\check{q}_c$ and $\lambda$ were sampled from intervals $[\hat{\varepsilon}_1(k), 1275]$ KB and $[0.5, \hat{\varepsilon}_2(k)]$ packets-per-second. Mean reward curves obtained when using our curriculum-based (CB) training approach were compared with the reward curves obtained when no CB (NCB) training approach was used. In this comparison, all curves corresponded to the case $C=1.0$. In the CB case, each task in the curriculum was used for $5 \cdot 10^5$ iterations before transitioning to the next task. The CB approach consistently outperformed the NCB approach in terms of mean reward per iteration. After $5 \cdot 10^6$ iterations, the mean reward achieved was 362.1 for CB and 334.1 for NCB.

The performance of two CB training approaches using different DNN configurations (i.e., $DNN_1$ and $DNN_2$) were also compared. The input and output layer for both configurations had 10 and 1 neurons, respectively. $DNN_1$ featured two hidden layers with 16 neurons each, and $DNN_2$ featured two hidden layers with 128 neurons each. In this case, tasks $k=0, \ldots, 8$ were used to train the policy for $5 \cdot 10^6$ iterations each while task $k=9$ was used for $10^7$ iterations. The CB approach with $DNN_1$, achieved a mean reward of 358.8 at the end of training and outperformed the CB approach using $DNN_2$, which achieved a mean reward of 347.8 at the end of training. Additional metrics such as the total loss, VF loss, the VF explained variance and entropy values may be used to select the final LFC policy. In the performance comparison mentioned above, the $DNN_1$ configuration obtained a total loss value of 0.65, a VF loss of 0.84, a VF explained variance of 0.35, and an entropy of 0.68. The $DNN_2$ configuration obtained a total loss value of 1.91, a VF loss of 2.41, a VF explained variance of −0.09, and an entropy of 0.20.

The LFC policy obtained when using $DNN_1$ was further analyzed. The performance of this policy when managing the queue was compared with the performance of the policies obtained via the NCB-approach using $DNN_1$, the CB approach using $DNN_2$, a policy that chooses actions at random, and a deterministic policy based on a threshold, termed THP. The THP policy stops accepting packets when packets are first dropped. Then, it waits till the queue is emptied to resume accepting packets. Table I illustrates the performance of these policies for different $\check{q}_f$ and $\lambda$. The average reward $\bar{r}$, mean sojourn time $\bar{\delta}_{mean}$ in seconds, number of packets lost due to dropout $\bar{l}$, and number of packets enqueued $\bar{p}$ were used as comparison metrics. Values in bold font identify the best value obtained per metric for $NCB\text{-}DNN_1$ and $CB\text{-}DNN_1$.

approach was able to yield a balanced performance featuring low sojourn times and high packet throughput in most cases. The CB approach with $DNN_2$ yielded better $\bar{\delta}_{mean}$ and $\bar{l}$ values at the expense of significantly lower $\bar{p}$. The NCB-$DNN_1$ approach yielded a more aggressive policy that, albeit yielding slightly higher $\bar{p}$, was unable to deal effectively with congestion and packet losses as indicated by the resulting $\bar{\delta}_{mean}$ and $\bar{l}$ values. Both $NCB\text{-}DNN_1$ and $CB\text{-}DNN_1$ outperformed the Random and THB policies in terms of $\bar{p}$.

Figure 3:
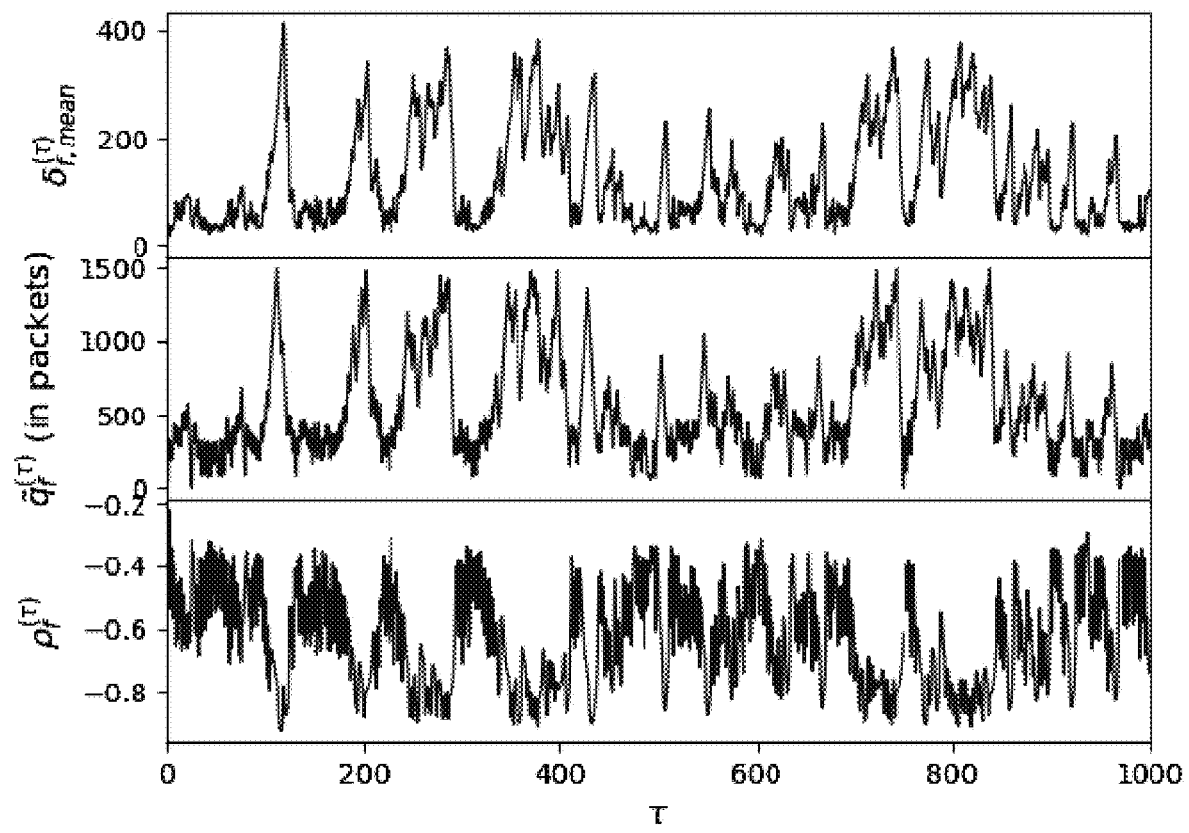
FIG. 3 is a plot of data.
Figure 4:
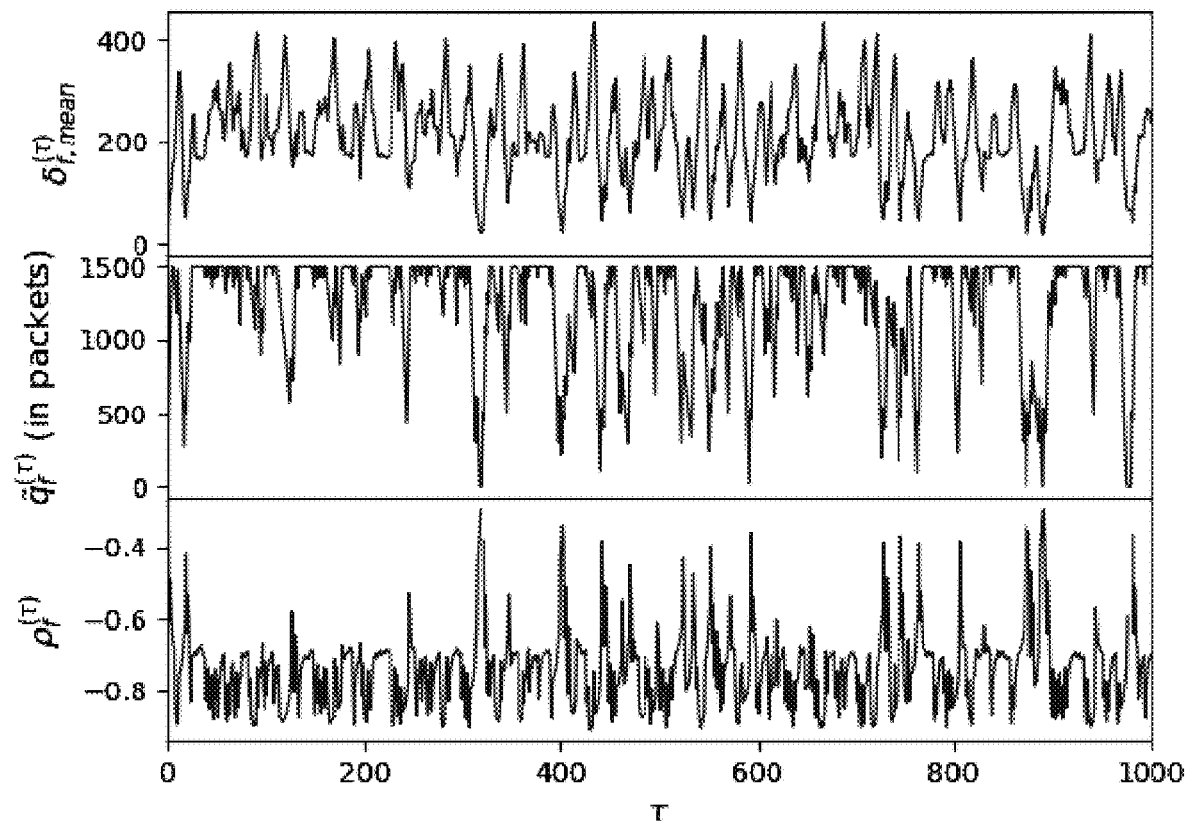
FIG. 4 is a plot of data.

FIGS. 3 and 4 are plots showing portfolio rates of return for a queue of size $\check{q}_f=225$ KB using a packet price model with the parameters $g(b_i)=b_i$, $\alpha_f=1$, $\gamma=0.9993$ and $\eta_f=60$ for an individual node using the $CB\text{-}DNN_1$ LFC policy described above. In FIG. 3, which shows an example low packet arrival rate, $\lambda=5.3$. In FIG. 4, which shows an example high packet arrival rate, $\lambda=8.5$. We start by exploring the numerical evolution of the portfolio rates of return $\rho_f^{(\tau)}$ for different traffic loads. FIGS. 3 and 4 show the evolution of $\rho_f^{(\tau)}$, updated at each decision epoch $\tau$, together with the evolution of the queue occupancy $\check{q}_f^{(\tau)}$ in unit of packets and the mean sojourn time $\delta_{mean}^{(\tau)}$. The plots in FIGS. 3 and 4 illustrate the close correlation between both high queue occupancy and high sojourn times, and the higher rates of return associated with the flow. As expected, $\rho_f^{(\tau)}$ increases sharply when both the sojourn time and the queue occupancy decrease. It was observed that increasing $\eta_f$ made the rates of returns less sensitive to the sojourn time variability.

Figure 5:
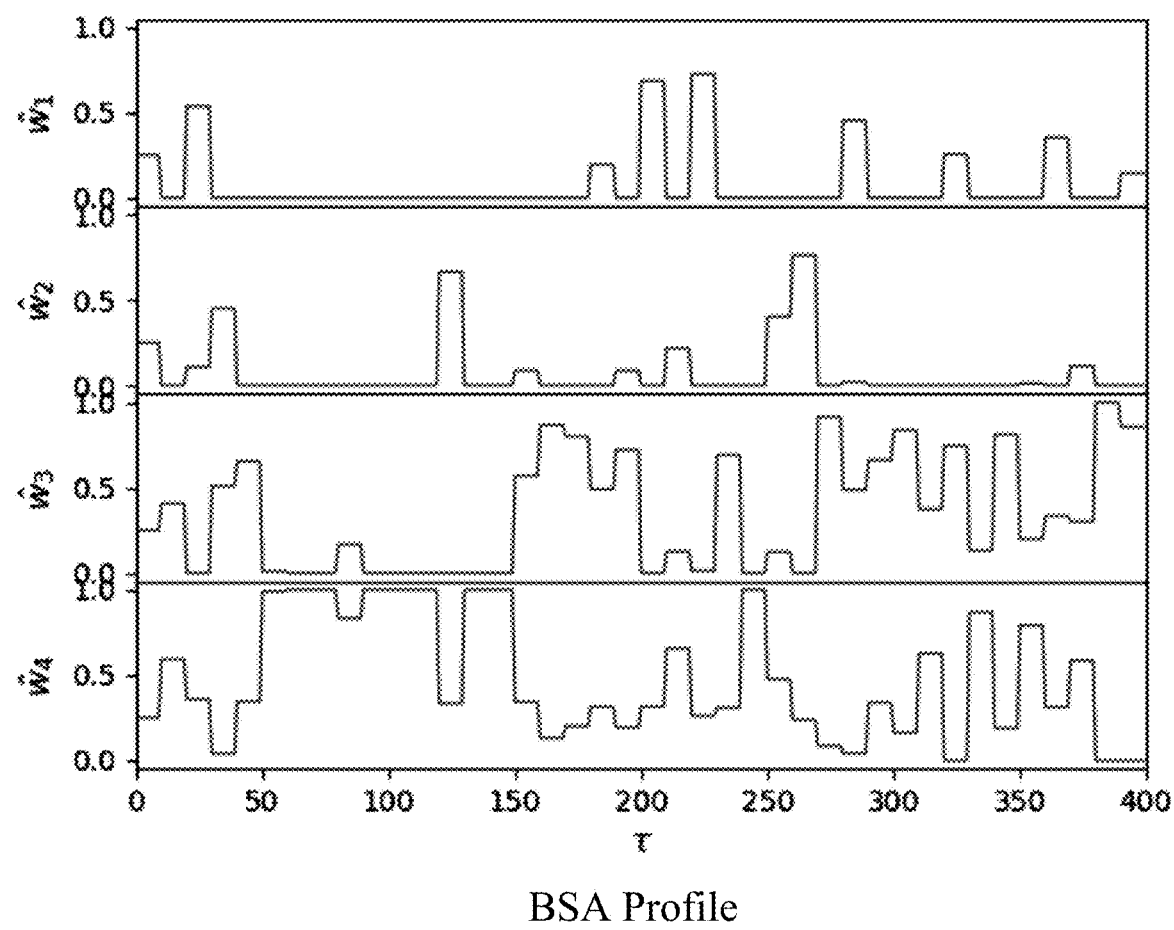
FIG. 5 is a plot of data.
Figure 6:
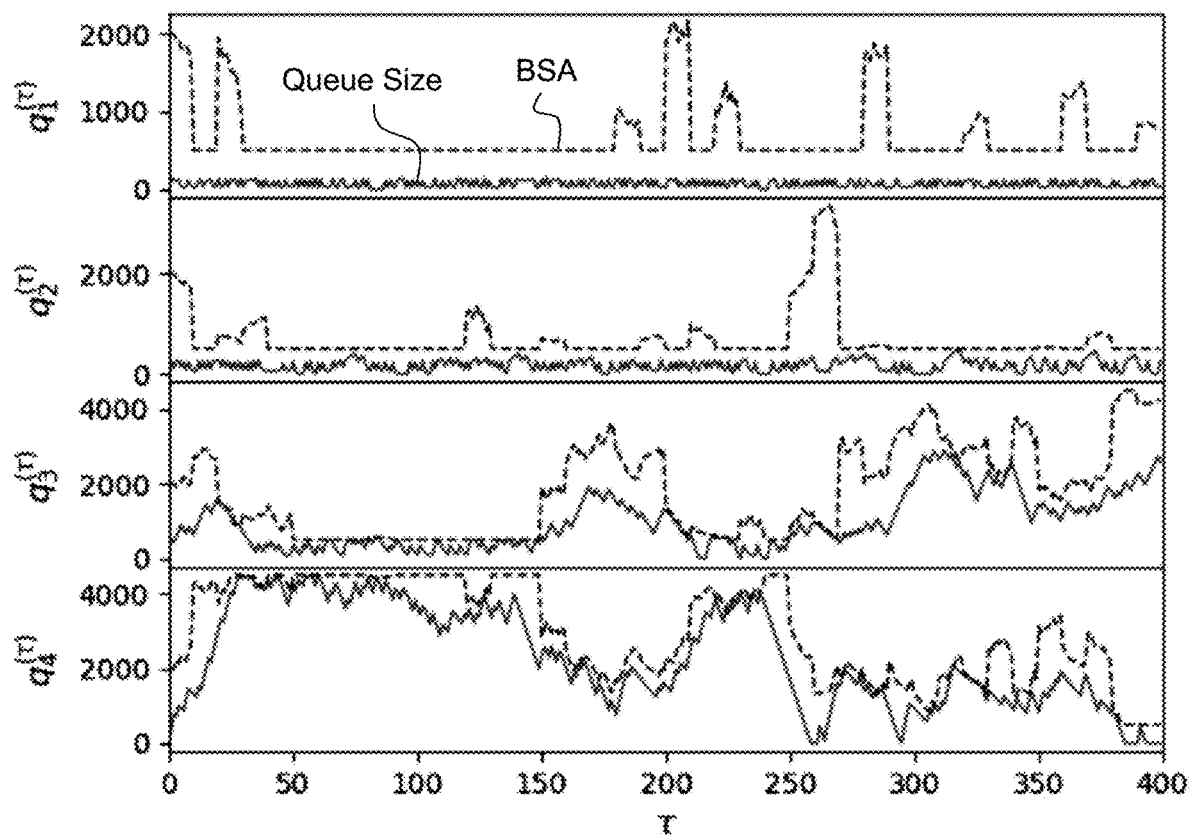
FIG. 6 is a plot of data.

FIGS. 5 and 6 are plots showing an example BSA profile and $\{q_f^{(\tau)}\}_{f=1}^4$ for $\theta=3$. The dashed line in FIG. 6 shows the actual BSA per queue measured in packets. For the CB-$DNN_1$ LFC policy discussed above, the queue configuration within the node comprised four FIFO queues with $Q=900$ KB and $Q_0=75$ KB (roughly 1 500 and 500 packets, respectively). The value $\lambda_f$ for the f-th queue was set to $\lambda_f=2f$, with $f=1, \ldots, 4$. The packet price model used had parameters $g(b_i)=b_i$, $\alpha_f=1$, $\gamma=0.9993$ and $\eta_f=60$. FIGS. 5 and 6 respectively illustrate the BSA profile $\hat{w}^{(\tau)}$ and the actual evolution of the queues in terms of queue size with the BSA recomputed every 10 iterations, i.e., every 10 minutes, via Equation (4). Parameter $\theta$ controls the sensitivity of the BSA profile to the perceived risk of the rates of return. In this example, lower values of $\theta$ were preferred due to the uncorrelated nature of the traffic in time. Larger values of $\theta$ led to a BSA profile that allocated significant memory resources to Flows 1 and 2 even when they were not needed due to the increased emphasis placed on minimizing risk. Table II shows performance metrics obtained with method 10 and compares them with a queue management strategy using our LFC Policy and fixed BSA profile of 225 KB per

TABLE I

| | $\check{q}_f$ = 125 KB | | | | | | | | $\check{q}_f$ = 225 KB | | | | | | | |
| --- | --- | --- | --- | --- | --- | --- | --- | --- | --- | --- | --- | --- | --- | --- | --- | --- |
| | $\lambda$ = 5.3 | | | | $\lambda$ = 8.5 | | | | $\lambda$ = 5.3 | | | | $\lambda$ = 8.5 | | | |
| Policy | $\bar{r}$ | $\bar{\delta}_{mean}$ | $\bar{l}$(×1k) | $\bar{p}$(×1k) | $\bar{r}$ | $\bar{\delta}_{mean}$ | $\bar{l}$(×1k) | $\bar{p}$(×1k) | $\bar{r}$ | $\bar{\delta}_{mean}$ | $\bar{l}$(×1k) | $\bar{p}$(×1k) | $\bar{r}$ | $\bar{\delta}_{mean}$ | $\bar{l}$(×1k) | $\bar{p}$(×1k) |
| Random | 264.6 | 40.6 | 0.2 | 46.9 | 242.0 | 70.4 | 12.4 | 63.6 | 263.1 | 40.2 | 0.0 | 46.4 | 253.9 | 128.0 | 7.0 | 70.0 |
| THP | 241.3 | 69.6 | 2.1 | 61.6 | 155.7 | 48.5 | 8.9 | 54.2 | 244.8 | 138.4 | 1.2 | 71.5 | 159.6 | 97.0 | 6.3 | 66.2 |
| NCB-DNN$_1$ | 350.2 | 84.6 | 0.9 | 69.1 | 331.9 | 147.5 | 45.8 | 80.5 | 350.2 | 131.2 | 0.2 | 69.3 | 317.0 | 303.0 | 45.0 | 81.2 |
| CB-DNN$_1$ | 357.7 | 63.2 | 2.4 | 66.9 | 332.7 | 126.3 | 27.8 | 77.8 | 354.5 | 103.7 | 0.1 | 68.8 | 284.9 | 218.7 | 44.2 | 80.3 |
| CB-DNN$_2$ | 142.5 | 39.8 | 0.0 | 3.6 | 286.9 | 33.7 | 0.6 | 7.4 | 201.3 | 37.9 | 0.0 | 5.0 | 223.8 | 69.1 | 5.4 | 27.3 |

All results in Table I are averages obtained over 25 Monte Carlo runs for each policy. Interestingly, the CB-$DNN_1$ queue. The choice of $\theta=3$ strikes a reasonable balance between $\bar{l}$, $\bar{p}$ and sojourn time.

TABLE II

| Policy | $\bar{z}$ (×1k) | $\bar{p}$(×1k) | $\delta_{4, median}$ |
|---|---|---|---|
| Fixed BSA 225 KB per queue | 35.3 | 228.7 | 262.0 |
| LFC CB $DNN_1$ with BSA θ = 3 | 9.2 | 234.1 | 635.7 |
| LFC CB $DNN_1$ with BSA θ = 9 | 15.4 | 222.0 | 232.2 |

From the above description of the method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for controlling congestion in intermittently-connected and lossy computer networks comprising:
   determining, at a local network node, a payoff score for each of a plurality of active flows of network traffic, wherein each active flow consists of a stream of in-transit packets at the local network node that come from a common source and share a common destination, wherein each active flow's payoff score is based on a pricing model that considers both a sojourn time and a position in a queue of each of an active flow's constituent packets;
   allocating unused buffer space across all active flows in the local network node based on relative traffic loads with a buffer-space allocation (BSA) agent; and
   controlling a rate at which packets from all active flows are received at the local network node with a hop-by-hop local-flow-control (LFC) agent according to each flow's payoff score.

2. The method of claim 1, wherein the controlling step comprises:
   deciding with the LFC agent according to an LFC policy whether or not to perform one of the following actions for a given active flow to mitigate network congestion: reduce a flow speed, pause the given flow, or restart the given flow if paused; and
   wherein the LFC policy is learned via a Proximal Point Optimization (PPO) deep reinforcement learning algorithm using a Markov Decision Process (MDP) as a modeling abstraction of the queue dynamics.

3. The method of claim 2, wherein the BSA agent follows a BSA policy that allocates greater buffer space to active flows having higher payoff scores according to a Markowitz Portfolio Selection problem that takes into consideration a measure of risk that is quantified through a variability of returns received from each active flow.

4. The method of claim 3, wherein each flow corresponds to one of a plurality of traffic classes, and wherein the given flow inherits prioritization and quality-of-service requirements from the traffic class to which it corresponds.

5. The method of claim 4, further comprising forcing upstream nodes to adjust a forwarding rate of the given flow if the LFC agent decides to pause the given flow at the local network node.

6. The method of claim 5, wherein the LFC agent is a computer software module running on the local network node.

7. The method of claim 6, wherein the BSA agent is a computer software module running on the local network node.

8. The method of claim 1, wherein the network traffic is underwater network traffic.

9. The method of claim 3, further comprising assigning each active flow to an individual active queue in which its constituent packets are stored, wherein each active queue is managed by the BSA agent, the LFC agent and a packet scheduler (PS) according to a first in, first out policy and a tail-drop management scheme.

10. The method of claim 9, wherein each active queue receives a minimal space allocation.

11. The method of claim 10, further comprising reallocating, with the BSA agent, unused buffer space to a queue associated with a newly arrived traffic flow.

12. The method of claim 11, further comprising periodically reevaluating and adjusting, with the BSA agent, buffer-space allocations based on traffic characteristics of each flow.

13. The method of claim 12, further comprising dropping any new packet arriving at the local network node that is assigned to a queue that is full according to the BSA policy and the tail-drop management scheme.

14. The method of claim 13, wherein packets are forwarded from active queues based on a schedule and transmission order defined by the PS.

15. The method of claim 14, further comprising dynamically adjusting the PS to accommodate network traffic dynamics and changes in available transmission bandwidth.

16. The method of claim 15, wherein the PS is configured to always grant requests from neighboring nodes to perform one or more of the following for a given active flow: reduce a bandwidth allocation, pause, and restart.

17. The method of claim 16, wherein when a given flow's transmission rate is reduced or paused in response to an LFC request, the PS does not reallocate available bandwidth to any other flow.

* * * * *